(12) United States Patent
Guan

(10) Patent No.: US 11,264,874 B2
(45) Date of Patent: Mar. 1, 2022

(54) CURRENT-CONTROLLED MOTOR

(71) Applicant: Weiwei Guan, Maoming (CN)

(72) Inventor: Weiwei Guan, Maoming (CN)

( * ) Notice: Subject to any disclaimer, the term of this patent is extended or adjusted under 35 U.S.C. 154(b) by 123 days.

(21) Appl. No.: 16/600,430

(22) Filed: Oct. 11, 2019

(65) Prior Publication Data
US 2020/0287449 A1 Sep. 10, 2020

(51) Int. Cl.
*H02K 17/08* (2006.01)
(52) U.S. Cl.
CPC .................................. *H02K 17/08* (2013.01)
(58) Field of Classification Search
CPC ............................. H02K 17/08; H02K 99/20
See application file for complete search history.

(56) References Cited

U.S. PATENT DOCUMENTS

| 10,361,613 B2 | 7/2019 | Li et al. |
| 2013/0043762 A1* | 2/2013 | Ludois .............. H02K 13/003 310/219 |
| 2013/0320948 A1 | 12/2013 | Hirotsu et al. |
| 2018/0138791 A1 | 5/2018 | Sun et al. |

FOREIGN PATENT DOCUMENTS

| CN | 1057553 A | 1/1992 |
| CN | 108432094 A | 8/2018 |

* cited by examiner

*Primary Examiner* — Ramon M Barrera

(57) ABSTRACT

The disclosure relates to the technical field of motor driven, and in particular to a current-controlled motor. The motor includes a rotator assembly, a stator assembly, external connectors and bearings, wherein the stator assembly is in driven connection with the rotator. And the rotator assembly is connected with the bearings which connected with the external connector. Two capacitance structures are formed by the outer surfaces of the two ends of the rotator assembly and the inner surface of the relative position of the external connector with air gap between them.

11 Claims, 8 Drawing Sheets

CURRENT-CONTROLLED MOTOR

CROSS-REFERENCE TO RELATED APPLICATIONS

This application claims priority to Chinese Patent Application No. 201910175637.7 with a filing date of Mar. 8, 2019. The content of the aforementioned applications, including any intervening amendments thereto, are incorporated herein by reference.

TECHNICAL FIELD

The disclosure relates to the technical field of motor drive, and in particular to a current-controlled motor.

BACKGROUND OF THE PRESENT INVENTION

Motor is a kind of device that converts electric energy into mechanical energy by electromagnetic induction, which has been widely used in life or industry. But, the existing motors mainly function by changing magnetic field intensive on wireframe, so as to generate induction current. The induction current needs a lot of power to be generated, so these motors are high power consumption. And the induction current is generated by changing the magnetic field intensive, the peak value of current is limited by changing frequency of the magnetic field, Causing problems like the power efficiency of existing motor is low and the rotate speed is limited by changing magnetic field, and the so on.

SUMMARY OF PRESENT INVENTION

In order to overcome the above defects (shortages) existing in the prior art, the disclosure provides a current-controlled motor.

To solve the above technical problems, the technical solution of the disclosure is as follows:

A current-controlled motor, includes a rotator, a stator, external connectors and bearings. The stator is driven connect with the rotator. and the rotator is connected with bearing which is connected to external connector. Two capacitance structures are formed by the outer surfaces of the two ends of the rotator assembly and the inner surface of the relative position of the external connector with air gap between them. When in use, the external connector is connected with an alternating current power source, and direct current is formed on the rotator assembly through two capacitance structures.

Further, the rotator assembly comprises capacitor body, a conductor and a spindle, wherein the capacitor body is arranged at two ends of the conductor in the rotator, and the capacitor body is parallel to the inner surface of the external connector to form a capacitance structure; the spindle is mounted inside the conductor, which is fixedly connect with the conductor and is insulated with the conductor. and the conductor is of a hollow cylinder shape or a hollow bird cage shape.

Further, a plurality of grooves are selectable formed on the conductor.

Further, the driven connection structure of the stator and the rotator is a structure of driven outer wheel or a structure of driven inner wheel.

Further, there are two bearing on each end of the spindle in the rotator.

Further, the stator assembly is a conductor of hollow cylinder body, or wires of cage-shaped structure (the hollow cylinder stator type).

Further, the stator assembly is connected with an external controllable power supply which could be a direct current power supply or an alternating current power supply for controlling purpose. When in use, the stator forms different magnetic fields around the rotator.

Further, the motor may adapts the prior art and could use an excitation coil type stator (the magnetic excitation coil type).

Compared with the prior art, the disclosure utilizes the capacitive structure formed by the outer surfaces of the two ends of the rotator and the inner surface of the relative position of external connectors to allow alternating current introduced on the external connector to form stable direct current on a hollow cylinder conductor of the rotator so that the rotator rotates by an Ampere force from a magnetic field intensive. According to the motor of the disclosure, a high-frequency fluctuating magnetic field intensive does not need to be generated at the stator, so that the controllability of the motor is enhanced, the efficiency of the motor power is improved, and the motor may obtain a higher speed.

Figure 1:
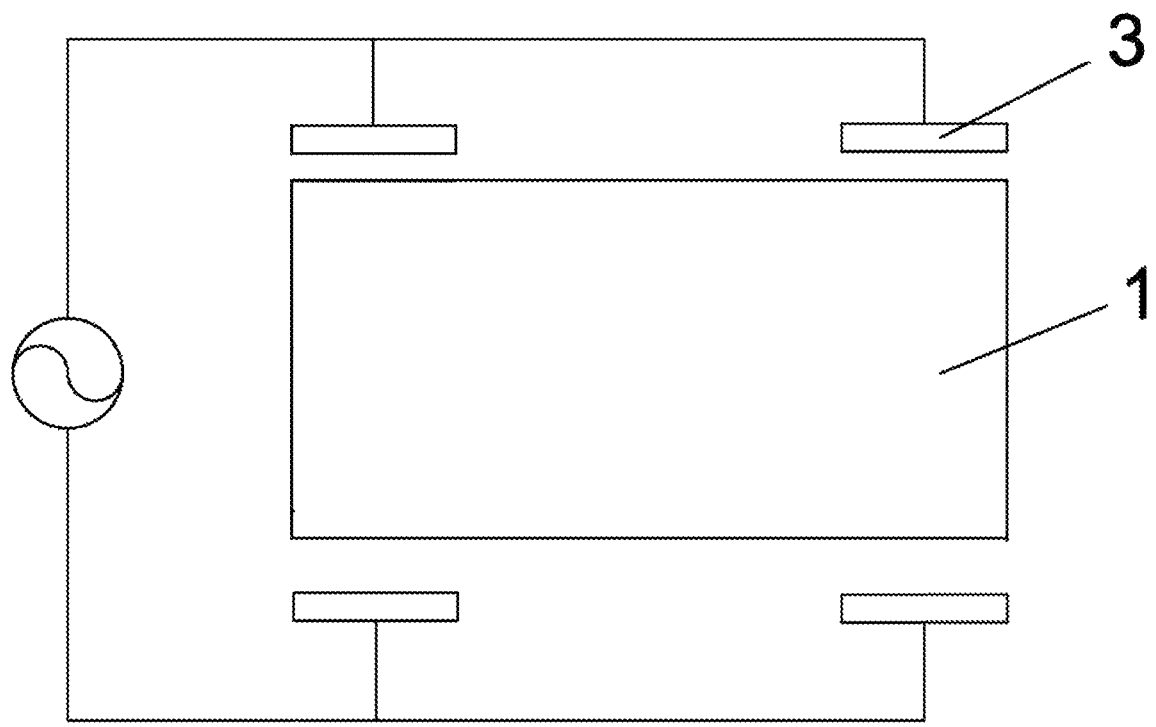
FIG. 1 is a cross-sectional view of a rotor according to an embodiment of the disclosure.

Where, 1, rotor 2, stator, 3, external connector; 21, coil; 22, exciter

DETAILED DESCRIPTION OF PREFERRED EMBODIMENTS

In order to facilitate the understanding of those skilled in the art, the technical solution of the disclosure will be further explained in combination with accompanying drawings and embodiments.

Embodiment 1

A current-controlled motor, referring to FIGS. 1-4, includes a rotator 1, a stator 2 and external connectors 3, bearings. (In this embodiment, external connectors 3 are used as external shell,) wherein the rotator 1, the bearings and the stator 2 are all arranged inside the external connector 3, the external connector 3 is capable of protecting the internal elements of the motor and avoiding or reducing the internal elements to be externally damaged, the stator 2 and the rotator 1 are in driven connection through the bearings (the stator 2 can drive the rotator 1 to rotate by using bearings for connection). There are two bearings, the two bearings are arranged at the two ends of the spindle in rotator 1 (the spindle could be formed on the conductor in rotator 1 if the conductor is hollow cylinder and a spindle is not preferred in the middle), the bearings are electrically connected with the rotator 1 (the bearings can also introduced current into the rotator 1 when using for connection). And then two capacitance structures formed with the outer surfaces of the two bearings and the outer surfaces of the external connector 3 (this embodiment use air bearings in hollow cylinder rotator. air bearing use high press air from nozzle in a square box to make rotator steady and rotate, one capacitance plane is formed by placed metal plane in the bearing box which is part of the outer surfaces of the external connector 3, the other capacitance plane is the capacitance body in the rotator assembly 1 mentioned as the outer surfaces of bearings. The air bearing is complicate, fix function better used spindle and plane bearings to implement separated). When two external connectors 3 are connected with alternating current power supply, Stable direct current are formed on the conductor of rotator 1 through the two capacitance structures.

In some embodiments, the rotator 1 includes a spindle and a conductor. The conductor is arranged at the outer space of the spindle and fixed in the spindle. The conductor may adopt a hollow cage shape or a hollow cylinder shape, of course, may also be of any other proper shapes. In this embodiment, the conductor is of a hollow cylinder body. When in use, stable magnetic field is formed by the stator 2, and then the conductor rotates under the action of the Ampere force, which drives the whole rotor 1 to rotate around axis namely the spindle, and thus the motor generates power.

Figure 4:
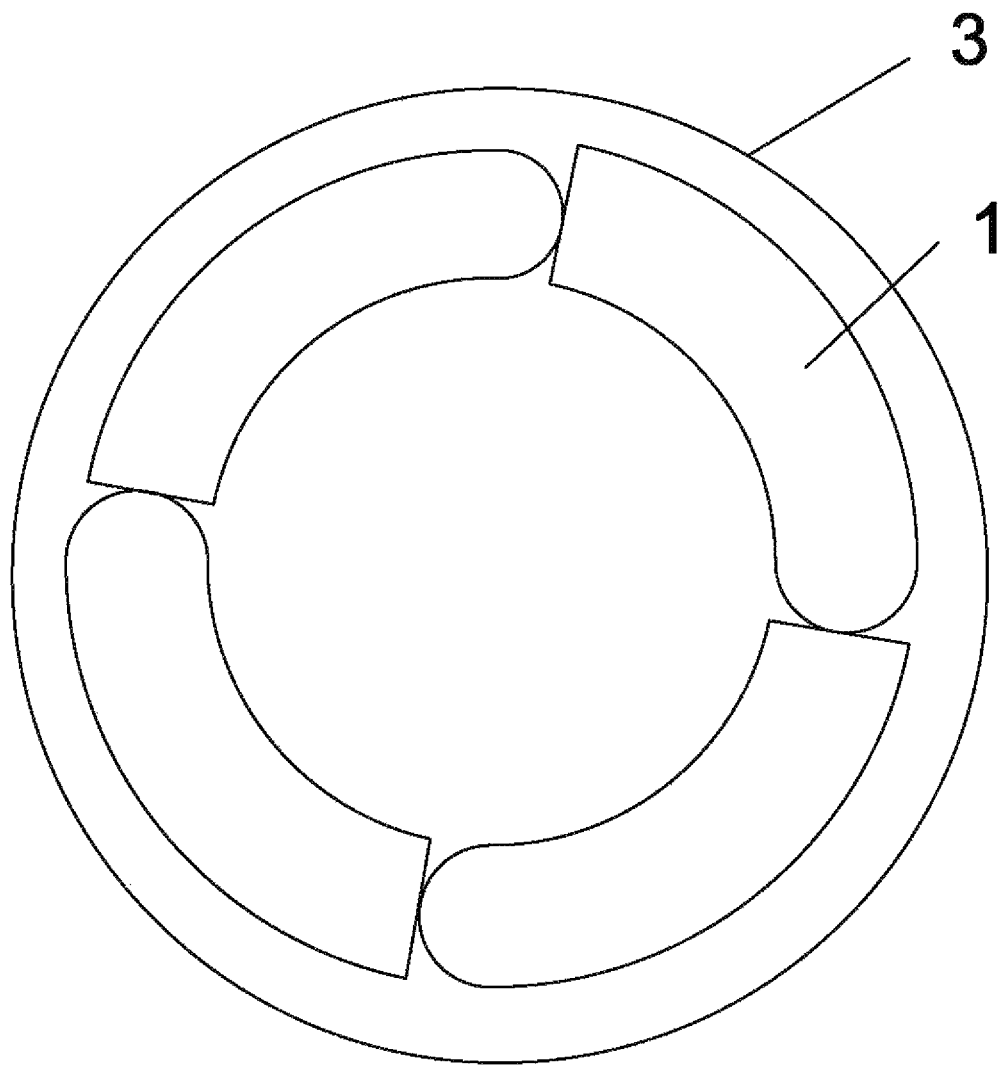
FIG. 4 is a structural diagram of the hollow cylinder rotator with grooves type according to an embodiment of the present disclosure.

In some embodiments, as shown in FIG. 4, the conductor is provided with a plurality of grooves which may increase the rotational force of the conductor.

In some embodiments, the bearings may be air bearings, of course, may also be any other proper bearings. In this embodiment, the bearings are the air bearings. Compared with plain bearings, the air bearings are small in viscosity and have high temperature resistance, and may ensure the reliability of the motor when the motor rotates at a high speed.

In some embodiments, the driven connection structure formed by the stator assembly 2 and the rotor assembly 1 could be a structure of drive outer wheel or a structure of drive inner wheel. When the stator assembly 2 is arranged inside the rotor assembly 1 so as to form the drive outer wheel structure; when the rotator assembly 1 is arranged inside the stator assembly 2 so as to form the drive inner wheel structure of the motor.

Figure 3:
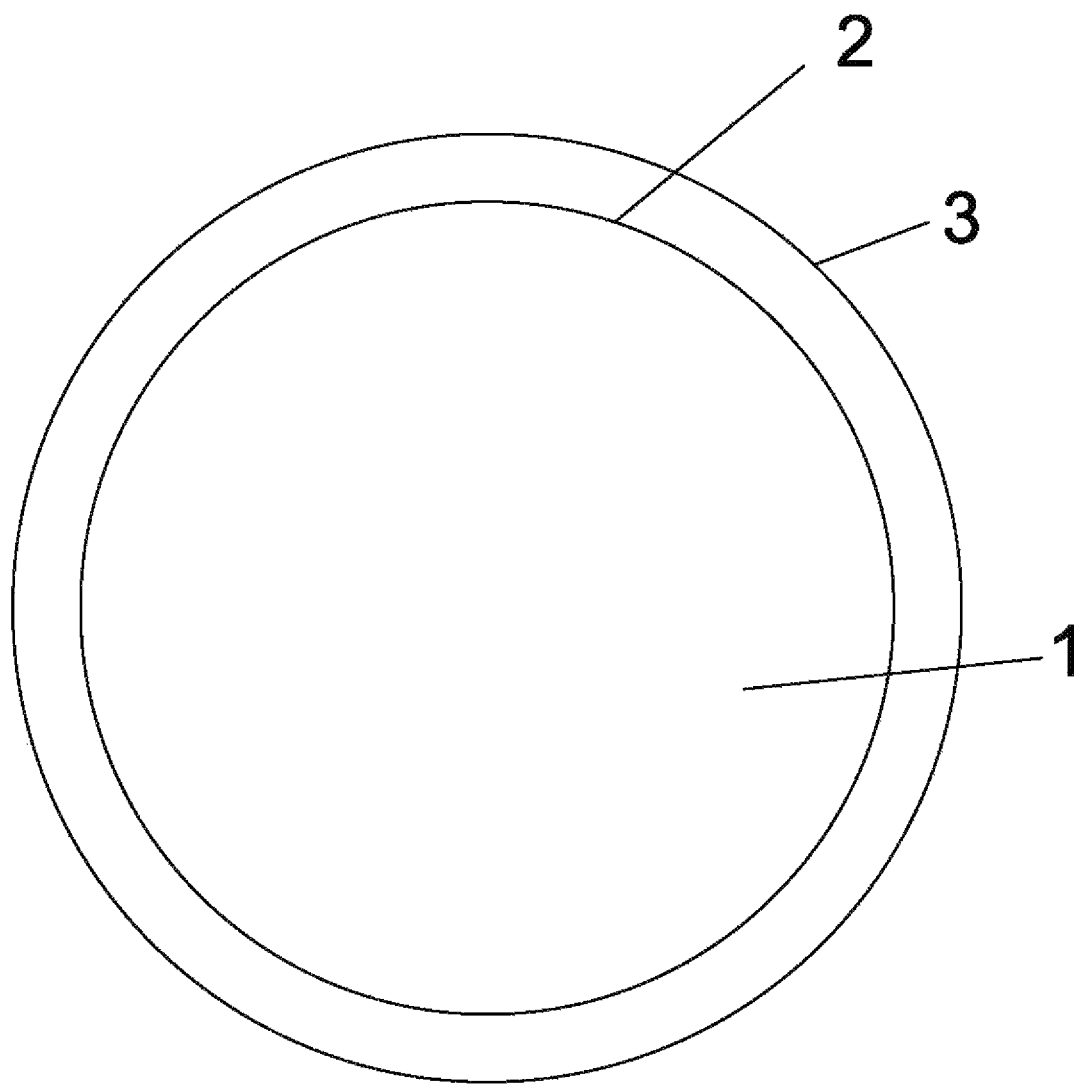
FIG. 3 is a structural diagram of the hollow cylinder stator type according to an embodiment of the disclosure.

In some embodiments, as shown in FIG. 3, the stator assembly 2 is composed of hollow cylinder structure. According to control need, the two ends of the stator assembly 2 is induced direct current or alternating current through the external power supply to form a controllable magnetic field at the rotator assembly 2. In this embodiment, the two ends of the stator assembly 2 are connected with the external direct current power supply, and the direction of the current at stator assembly 2 is the same as the current direction of the rotator assembly 1. then a positive electron ionized layer is generated between the rotator assembly 1 and the stator assembly 2, at this moment, the rotator assembly 1 is acted by a positive electrical field. The stator assembly 2 generates a exclusive force to the rotator assembly 1, meanwhile the stator assembly 2 may generate a magnetic field vertical to the tangential direction of the rotator assembly 1 (the electron also move in normal direction due to exclusive force or by the electrical field). The rotator assembly 1 is acted by the vertical magnetic field to generate a tangential ampere force. the rotator assembly 1 rotates by the, combination of the tangential ampere force and the exclusive force and the rotator assembly 1 may maintain a high rotation speed by the force combination.

Figure 2:
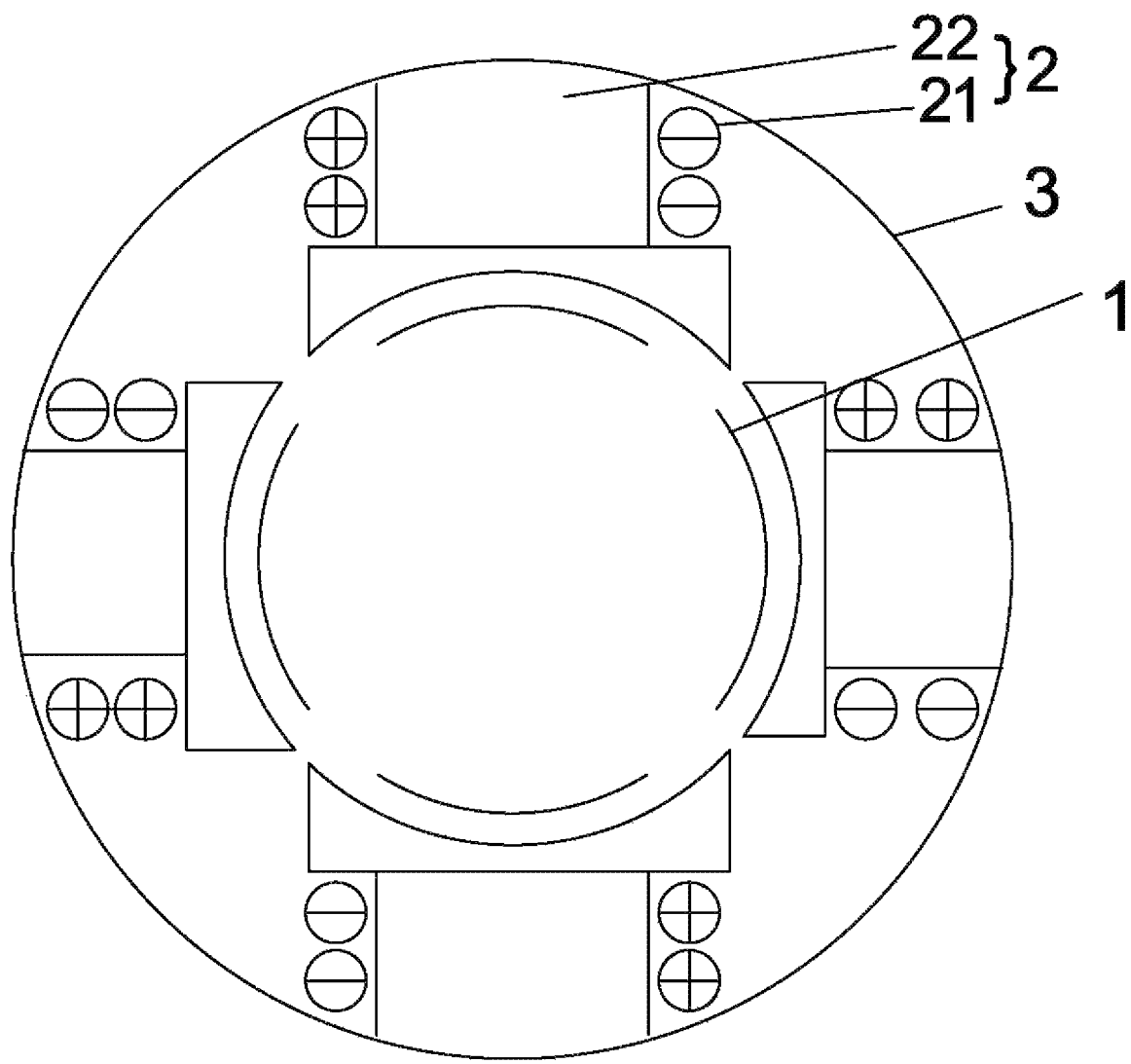
FIG. 2 is a structural diagram of the magnetic exciting coil stator type motor according to an embodiment of the disclosure.

In addition, in some embodiments, the motor may also adapt with a stator assembly of electromagnetic exciting coil, namely, the stator assembly is composed of electromagnetic exciting coils. When in use, control current is introduced into the coils so as to generate controllable constant magnetic field around the stator assembly, the magnetic line of force generated by the stator assembly 2 is vertical to the current direction of the rotator assembly 1 so that the rotator generates the ampere force in the tangential direction, thereby the rotator assembly 1 is driven rotate and the motor is implement. Particularly, as shown in FIG. 2, the stator assembly 2 of electromagnetic exciting coil is comprised of a coil 21 and exciters 22, the four exciters 22 are circumferentially and uniformly distributed along the center of gravity of the motor, and the coil 21 respectively winds the outer sides of the four exciters 22.

Embodiment 2

Figure 5:
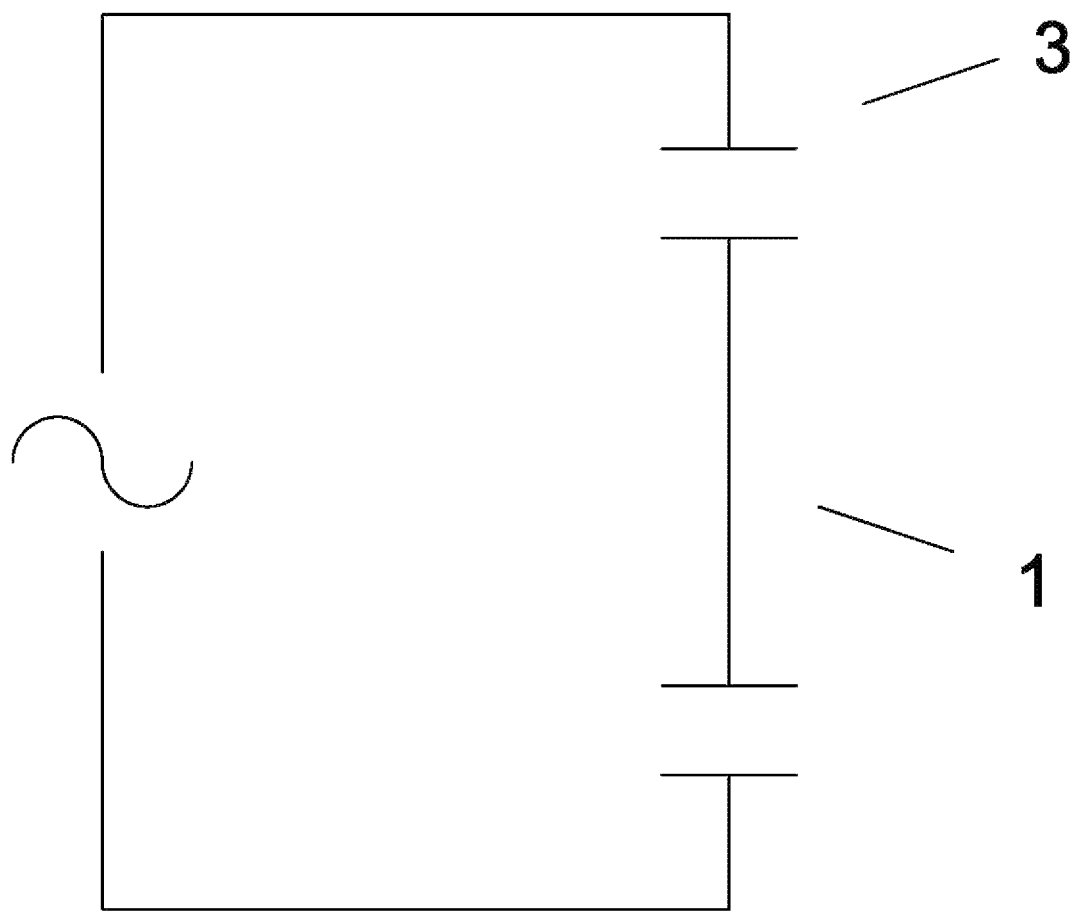
FIG. 5 is a circuit principle diagram of the rotator according to an embodiment of the disclosure.
Figure 6:
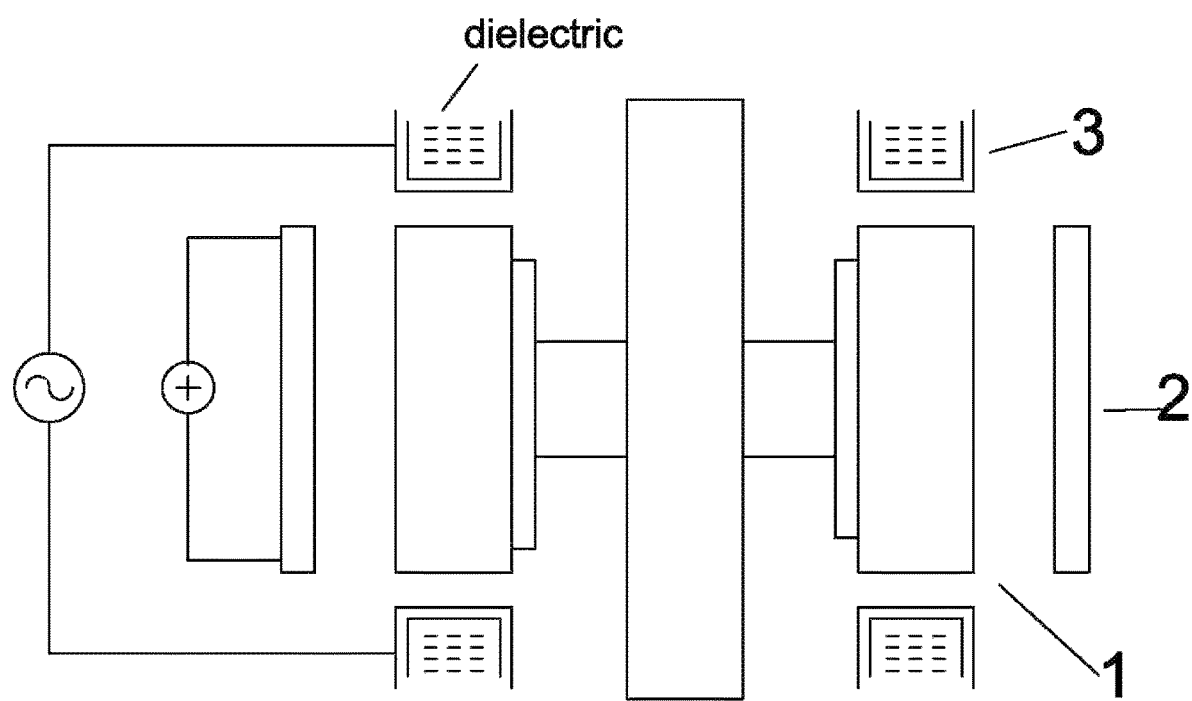
FIG. 6 is a cross-sectional view of the hollow cylinder stator type motor structure according to an embodiment of the disclosure.
Figure 7:
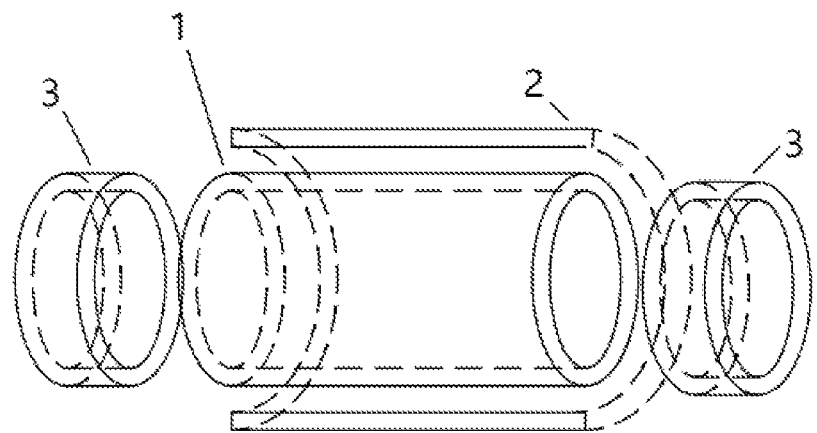
Figure 8:
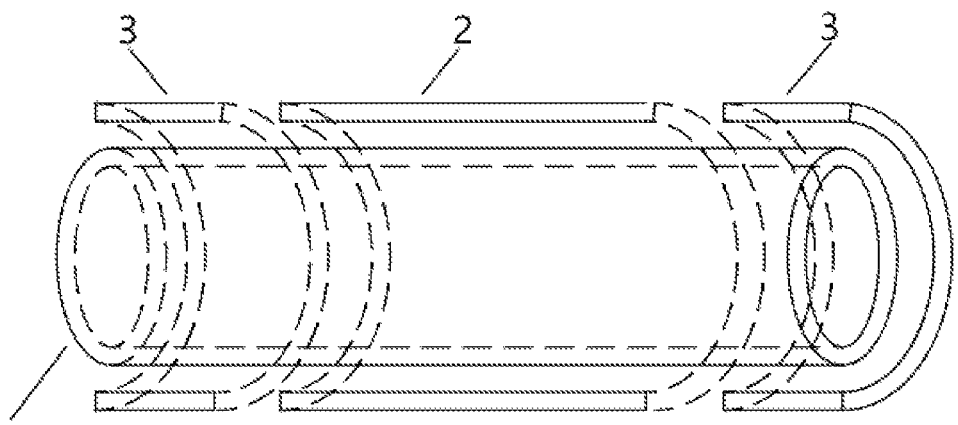
Figure 9:
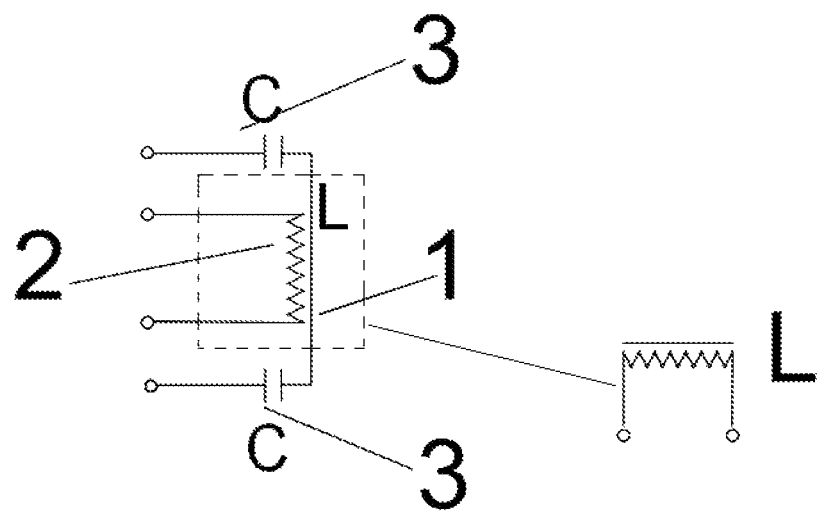
Figure 10:
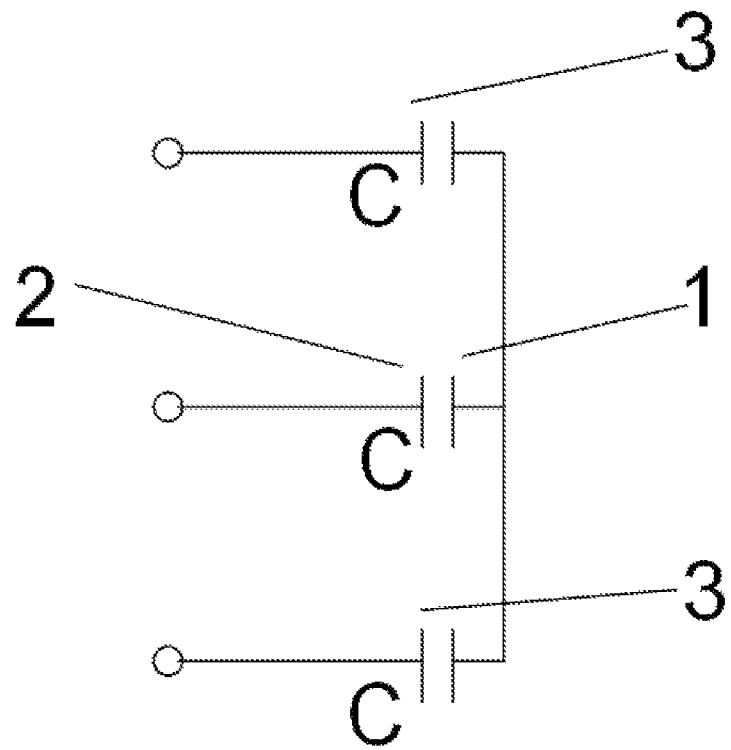

A current-controlled motor, referring to FIG. 5-6, includes a rotor assembly 1, a stator assembly 2 and external connectors 3, bearings. As shown in FIG. 5-6, capacitance structures are formed by the outer surfaces of two ends of conductor in the rotator assembly 1 and the outer surfaces of the external connectors 3. When two capacitance surfaces in external connectors 3 are connected with alternating power supply, stable direct current may be formed on the rotator assembly 1 through the two capacitance structures. Compared with FIG. 1, the capacitance structures shown in FIG. 5 are not limited to plane structure, two capacitance metal surfaces may adopt spherical, cylindrical, ring, comb and other shapes, or uses dielectric mediums having very high relative dielectric constants to achieve the purpose of increasing capacitance values. As shown in FIG. 6, the dielectric mediums having high relative dielectric constants are used in the external connectors 3 to increase capacitance value.

In some embodiments, as shown in FIG. 3, the stator assembly 2 is composed of hollow cylinder structure. As described in Embodiment 1, the rotator assembly 1 rotates by the combination of the tangential ampere force and the exclusive force. FIG. 6 is a cross-sectional view corresponding to FIG. 3.

In addition, as shown in FIG. 6, the external connector 3 is connected with saw-shaped alternating current to form direct current on the rotor assembly 1. According to Faraday's Law of electromagnetic induction, the capacitor body in the rotor assembly may generated induced electromotive force, namely, a constant direct voltage is generated in the conductor in the rotator assembly which means a current you can controlled in the conductor of the rotator assembly 1. When magnetic field is around the rotor generated by the stator, the rotor assembly 1 rotates under the ampere force to output power. In this embodiment, The plus and minus slope saw-shaped AC may introduced separately in the two external connector to control current. Particularity, the saw-shaped alternating current is introduced in only one side to simplify the structure.

In addition, as shown in FIG. 6, the external connector 3 may connected with direct-current high voltage power supply. According to capacitance characteristics. the capacitor structure could be break through under the condition that a voltage reaches requirements, direct current is formed on the rotator assembly 1.

In addition, as shown in FIG. 6, the external connector 3 may connected with the control power supply, in ordered to cooperate with the control power supply in stator. Two control power supply controls the rotator to rotate under the action of ampere force to output power.

In addition, according to capacitance characteristics in circuit principle, other different variations or changes are made in various embodiments.

Obviously, the aforementioned embodiments of the disclosure are only examples for clearly illustrating the disclosure, but not limiting the embodiments of the disclosure. For ordinary skill in the art, other different types of variations or changes may also be made on the basis of the above description. Here, there is no need and no way to exhaust all the implementations. Any modifications, equivalent replacements and improvements made within the spirit and principles of the disclosure shall be included in the scope of protection of the claims of the disclosure.

I claim:

1. A current-controlled motor, comprising a rotator assembly (1), a stator assembly (2), external connectors (3) and bearings, wherein the stator assembly (1) is in connection to the rotator assembly (1) as the rotator assembly (1) is drivable to rotate output, and the rotator assembly (1) is connected with the bearings which also connected the external connector (3); two capacitance structures are formed by outer surfaces of two ends of the rotator assembly (1) and inner surfaces of the relative position of the external connector (3) with air gap between them; when in use, the external connector (3) is connected with an alternating current power source and direct current is formed on the rotator assembly (1) through the two capacitance structures.

2. The current-controlled motor according to claim 1, wherein, the rotator assembly (1) comprises capacitor body, a conductor and a spindle, wherein the capacitor body is arranged at two ends of the conductor in the rotator assembly (1), and the capacitor body is parallel to the inner surface of the external connector (3) to form a capacitance structure; the spindle is mounted inside the conductor, which is fixedly connected with the conductor and is insulated with the conductor; and the conductor is of a hollow cylinder shape or a hollow bird cage shape.

3. The current-controlled motor according to claim 2, wherein, a plurality of grooves are selectable formed on the conductor.

4. The current-controlled motor according to claim 1, wherein, a drive connection structure of the stator assembly and the rotator assembly is a structure of drive outer wheel structure or a structure of drive inner wheel.

5. The current-controlled motor according to claim 2, wherein, the number of the bearings is two, and the two bearings are respectively arranged on two ends of the spindle in the rotator assembly (1).

6. The current-controlled motor according to claim 1, wherein, the stator assembly (2) is a conductor of hollow cylinder body, or wires of cage-shaped structure (the hollow cylinder stator type).

7. The current-controlled motor according to claim 6, wherein, the stator assembly (2) is connected with an external controllable power supply which is a direct current power supply or an alternating current power supply.

8. The current-controlled motor according to claim 1, wherein, the stator assembly (2) of the motor can use a magnetic exciting coil as an alternation (the magnetic exciting coil stator type).

9. The current-controlled motor according to claim 1, wherein, is a new motor species using short-distance wireless current-transferred conductor structure to function the rotator which is different from permanent-magnet rotator or magnet-excitation rotator; the current-transferred is using serial capacitor circuit.

10. The current-controlled motor according to claim 9, wherein, the direct current in the rotator is guaranteed by capacitor value and is controlled by an external AC power source; the capacitor value is achieved by a plate of high dielectric constant materials, or increasing an area of the plate, thickness of the plate, or reducing a gap depth of the plate.

11. The current-controlled motor according to claim 6, wherein, the stator and the rotator operate function in two cylinder surface when one is inner and the other is outer when current is transferred through two cylinder surface.

* * * * *